(12) United States Patent
Wang et al.

(10) Patent No.: US 9,298,114 B2
(45) Date of Patent: Mar. 29, 2016

(54) Y-TYPE OXOTITANIUM PHTHALOCYANINE NANOPARTICLES, PREPARATION, AND USE THEREOF

(75) Inventors: Yuan Wang, Beijing (CN); Dejian Liang, Beijing (CN); Wenlian Peng, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 296 days.

(21) Appl. No.: 14/002,938

(22) PCT Filed: Mar. 5, 2012

(86) PCT No.: PCT/CN2012/000279
§ 371 (c)(1),
(2), (4) Date: Nov. 7, 2013

(87) PCT Pub. No.: WO2012/119485
PCT Pub. Date: Sep. 13, 2012

(65) Prior Publication Data
US 2014/0054510 A1    Feb. 27, 2014

(30) Foreign Application Priority Data
Mar. 4, 2011    (CN) .......................... 2011 1 0052927

(51) Int. Cl.
*G03G 5/06*    (2006.01)
*C09B 67/50*    (2006.01)
*G03G 5/05*    (2006.01)

(52) U.S. Cl.
CPC .......... *G03G 5/0662* (2013.01); *C09B 67/0026* (2013.01); *G03G 5/0596* (2013.01); *G03G 5/0696* (2013.01); *Y10T 428/2982* (2015.01)

(58) Field of Classification Search
CPC .................................................. G03G 5/0696
USPC ................ 252/501.1, 519.12, 520.2; 540/141
See application file for complete search history.

(56) References Cited

U.S. PATENT DOCUMENTS

| | | | | |
|---|---|---|---|---|
| 2,155,038 A * | 4/1939 | Davies | .................... | C09B 47/04 540/140 |
| 3,825,422 A * | 7/1974 | Gruber | .................... | G03G 17/04 430/37 |
| 4,032,339 A * | 6/1977 | Grushkin | ............. | G03G 5/0696 430/1 |
| 4,557,868 A * | 12/1985 | Page | .................... | C09B 47/045 540/143 |
| 5,288,574 A * | 2/1994 | Desilets | ............. | C09B 67/0019 430/135 |
| 5,330,867 A * | 7/1994 | Hsiao | .................... | G03G 5/0696 430/130 |
| 5,334,478 A * | 8/1994 | Desilets | ............. | C09B 67/0016 430/135 |
| 6,447,965 B1 * | 9/2002 | Nakamura | .......... | C09B 67/0002 430/133 |
| 7,611,815 B2 * | 11/2009 | Sugiura | .................. | B82Y 30/00 106/426 |
| 8,242,261 B2 * | 8/2012 | Kuboshima | ......... | C09B 67/0016 540/141 |
| 2004/0106052 A1 | 6/2004 | Molaire | | |
| 2006/0236893 A1 * | 10/2006 | Lin | ...................... | G03G 5/0696 106/410 |
| 2011/0163304 A1 * | 7/2011 | Pan | ...................... | G03G 7/0026 257/40 |

FOREIGN PATENT DOCUMENTS

| | | | |
|---|---|---|---|
| CN | 1150261 A | | 5/1997 |
| CN | 1150261 A | * | 5/1997 |
| CN | 1342729 A | | 4/2002 |
| JP | 11-124512 A | | 5/1999 |
| JP | 2001-075298 A1 | | 3/2001 |

OTHER PUBLICATIONS

Dejian Liang et al., "Solvent-Stabilized Y-Type Oxotitanium Phthalocyanine Photoconductive Nanoparticles: Preparation and Application in Single-Layered Photoreceptors", Advanced Materials, 2012, 24, 5249-5253.*
Yuan Wang et al., "Solvent-Stabilized Photoconductive Metal Phthalocyanine Nanoparticles: Preparation and Application in Single-Layered Photoreceptors", Advanced Materials, 2010, 22, 1521-1525.*
Chao Wei et al, An Excellent Single-layered Photoreceptor Composed of Oxotitanium Phthalocyanine Nanoparticles and An Insulating Resin, Journal of Colloid and Interface Science, 16.5 2008, 325 198-202, 5 pages.
International Search Report on PCT/CN2012/000279, Sep. 3, 2013, 4 pages.
Shentu, Chao et al., Study on the Synthesis of Titanium Oxide Phthalocyanine in Y-type Crystal Form, Chemical Reagents, Oct. 2003, vol. 24, No. 5, pp. 305 and 312 (English Abstract).
International Preliminary Report on Patentability on WO2012119485, with English Translation, dated Sep. 10, 2013, 22 pages.
Written Opinion of the International Search Authority on WO2012119485, dated Jun. 14, 2012, with English Translation, 20 pages.

\* cited by examiner

*Primary Examiner* — Douglas McGinty
(74) *Attorney, Agent, or Firm* — Foley & Lardner LLP (57) ABSTRACT

Oxotitanium phthalocyanine nanoparticles in the crystal form of phase-Y (Y-TiOPc) having particle diameters of 2~4 nm, preparation, and applications thereof are disclosed. The preparation method comprises the following steps: mixing a concentrated sulfuric acid solution of TiOPc with water or dilute sulfuric acid, or water or dilute sulfuric acid with a surfactant dissolved therein, or an aqueous solution of a low molecular weight organic compound to form a suspension or hydrosol; adding into the resulting suspension or hydrosol chlorinated hydrocarbons to extract TiOPc into an organic phase, so as to form a colloidal solution of Y-TiOPc nanoparticles; and then, washing and drying the above nanoparticles to give rise to a powder of the Y-TiOPc nanoparticles. Such a nanoparticle powder can disperse in chlorinated hydrocarbons to form stable colloidal solutions, thereby providing an alternative approach for solving the problem of poor dispersibility for Y-type TiOPc.

16 Claims, 4 Drawing Sheets

Y-TYPE OXOTITANIUM PHTHALOCYANINE NANOPARTICLES, PREPARATION, AND USE THEREOF

RELATED APPLICATIONS

The present application is a U.S. National Stage of PCT International Application Number PCT/CN2012/000279, filed Mar. 5, 2012, which claims priority to Chinese Patent Application No. 201110052927.6, filed Mar. 4, 2011. The entire contents of the foregoing applications are hereby incorporated herein by reference.

TECHNICAL FIELD

The present invention relates to a kind of oxotitanium phthalocyanine nanoparticles in the crystal form of phase-Y (Y-TiOPc), preparation methods thereof, and uses of the same in single-layered photoreceptors.

BACKGROUND ART

Figure 1:
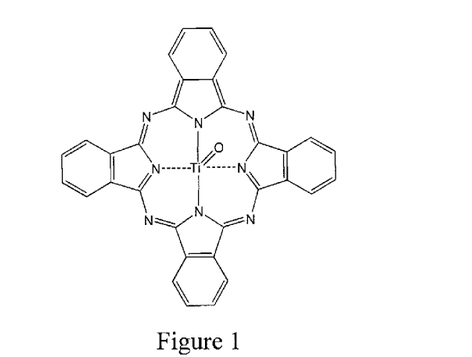
FIG. 1 is the molecular structural formula of TiOPc.

As one of the important organic semiconductive materials, phthalocyanine-based compounds are widely used, as charge-carrier generation materials, in organic photoreceptors which are core components in xerography. In addition, they are widely used in various photoelectric systems such as organic solar cells, thin film transistors, organic light-emitting diodes, image sensors and the like (de la Torre G., Claessens C. G., Tones T., *Chem. Commun.*, 2007, 2000). Generally, the unsubstituted phthalocyanine-based materials are superior in photoconductive properties to substituted phthalocyanine-based compounds; however, they have poor solubility and dispersibility in almost all kinds of solvents. The particles of unsubstituted phthalocyanines, prepared with conventional methods such as ball-milling or precipitation, have a particle diameter of about 20~500 nanometers, which can not disperse and form stable colloidal particles in organic solvents in the absence of additives, largely restricting the applications of the phthalocyanine-based materials. On the other hand, the probability of charge separation for excitons occurring on the surface of phthalocyanine photoconductors is much greater than that in the bulk phase (Niimi T., Umeda M., *J. Phys. Chem. B* 2002, 106, 3657), while excitons diffuse a short distance in organic semiconductors, thereby, reducing the sizes of phthalocyanine-typed photoconductors and improving the specific surface areas thereof also enhance the charge carrier generating efficiencies thereof. We have reported a method for preparing phase-II vanadyl phthalocyanine (II-VOPc) and phase-II oxotitanium phthalocyanine (II-TiOPc, TiOPc has a molecular structural formula as shown in FIG. 1) photoconductor nanoparticles (Zhang X. R., Wang Y. F., Ma Y., Ye Y. C., Wang Y., Wu, K., *Langmuir* 2006, 22, 344; Chao W., Zhang X. R., Xiao C., Liang D. J., Wang, Y., *J. Colloid Interface Sci.*, 2008, 325, 198), by which, the II-VOPc and II-TiOPc nanoparticles prepared can be dispersed in chloralkanes or chloroarenes to form stable colloidal solutions in the absence of additives. By dispersing such II-VOPc and II-TiOPc nanoparticles in an insulating resin, we have invented a single-layered organic photoreceptor (Wang Y. et al., Chinese patent No. ZL 03100821.6). As compared with the functional separation type multi-layered photoreceptors (such as Stolka, M et al., U.S. Pat. No. 4,265,990) and the single-layered organic photoreceptors composed of a small amount of phthalocyanines, a large amount of charge transfer materials and resins (such as KAWAHARA Emi et al., JP Patent 7291876-A), the positively charged single-layered photoreceptors consisted only of phthalocyanine photoconductor nanoparticles and insulating resins not only have the advantages of simple structure, low manufacturing costs, high stability, and wide applicability, but also can prevent a harm to the operator's health due to much ozone produced in the air when the surface is negatively charged; therefore, such a positively charged single-layered photoreceptor is one of major trends of the future organic photoreceptor development. The single-layered photoreceptor consisted of phase II VOPc or phase II TiOPc nanoparticles and insulating resins has a photoconductive mechanism, i.e., light-induced enhancement effect of electron tunneling, which is different from that of the functional separation type multi-layered photoreceptor and of the single-layered organic photoreceptor composed of a small amount of phthalocyanines, a large amount of charge transfer materials and resins. Such photoreceptors exhibit good photoconductive properties, however, there is a significant contradiction between the photoconductive sensitivity and dark decay rate thereof, that is, with the increase of the content of II-VOPc or II-TiOPc nanoparticles, both the photoconductive sensitivity of such single-layered photoreceptors as well as the dark decay rate thereof are remarkably increased. How to improve the photoconductive sensitivity of such single-layered photoreceptors while remarkably decreasing the dark decay rate thereof, this is a difficult problem needed to be addressed.

Much attention has been attracted to TiOPc due to diverse stacking patterns of molecules in its crystal and excellent photoconductive properties thereof (Law K. Y., *Chem. Rev.*, 1993, 93, 499; Weiss D. S., Abkowitz M., *Chem. Rev.*, 2010, 110, 479). Previous studies have shown that TiOPc has mainly four crystal forms, namely phase-I, phase-II, phase-Y, and phase-m, wherein, the phase-Y TiOPc (Y-TiOPc) exhibits the best photoconductive property (Fujimaki Y., Tadokoro H., Oda Y., Yoshioka H., Homma T., Moriguchi H., Watanabe K., Konishita A., Hirose N., Itami A., Ikeuchi S., *J. Imag. Tech.*, 1991, 17, 202), and a charge-carrier photogeneration quantum yield of more than 90%, much higher than that of other phthalocyanine materials.

In conventional technologies for preparing Y-TiOPc, generally, the TiOPc in a sulfuric acid solution is firstly added to water to form a TiOPc precipitate, and then, to the dried (or undried) precipitate, a crystal form regulator is added to transform the crystal form so as to obtain the Y-TiOPc particles. However, this method is prone to result in incomplete transformation of the crystal form, on one hand, leaving much TiOPc in other crystal forms mixed in the resulting products, and on the other hand, molecular rearrangement tends to take place on the interfaces between particles contacted with each other in the precipitate during transformation of crystal forms to form rigid connections among particles or increase the particle sizes, decreasing the dispersibility of the particles, which make it difficult to prepare Y-TiOPc nanoparticles of small sizes. Chinese Patent No. ZL00,124736.0 reported a preparation method for Y-TiOPc nanoparticles having a particle diameter of 5~20 nanometers, and Yang Lian-ming et al., using such Y-TiOPc nanoparticles as charge-carrier generation materials and hydrazone compounds as charge-carrier transport materials, prepared functional separation type multi-layered photoreceptors with excellent photoconductive properties. However, the Y-TiOPc nanoparticles prepared in accordance with this method can not disperse well in chloralkanes or chloroarenes to form a stable colloidal solution, and a lot of precipitates occurred after the dispersion stands for a certain period of time. The present inventors have tried to prepare single-layered organic photoreceptors by dispersing such nanoparticles into polycarbonates without adding any other charge-carrier transport materials; however, the resulting single-layered organic photoreceptors do not possess good overall photoconductive performances (see Comparative Example 2).

The present inventors have reported a preparation method for nanoscopic phthalocyanine-based organic semiconductor materials (Wang Y. et al., Chinese patent No. ZL 95117928.4). With this method, phthalocyanine nanoparticles having a particle diameter of 2~8 nanometers may be prepared. However, the present inventors have demonstrated in the experimental results that this method can only give nanoparticles of II-TiOPc with mediocre photoconductive properties rather than Y-TiOPc nanoparticles (see Comparative Example 1). Based on the above, there is neither a report of Y-TiOPc nanoparticles with a particle diameter within the range of 2~4 nanometers nor that of stable Y-TiOPc nanoparticle colloidal solutions formed by dispersing Y-TiOPc nanoparticles in solvents in the absence of the additives up to date. Therefore, reducing the sizes of Y-TiOPc nanoparticles and developing Y-TiOPc nanoparticles with high dispersion stability in organic solvents is a challenging subject that has important application prospects.

SUMMARY OF THE INVENTION

The purpose of the present invention is to provide a kind of Y-TiOPc nanoparticles, preparation method and uses thereof.

The Y-TiOPc nanoparticles provided by the present invention have particle diameters of 2 to 4 nanometers.

In particular, the above Y-TiOPc nanoparticles may have particle diameters of 2.8-3.7 nm, 2.8-3.5 nm, 2.8-3.4 nm, 2.8-3.1 nm, 2.8-2.9 nm, 2.8-3.0 nm, 2.8-3.2 nm, 2.9-3.7 nm, 2.9-3.5 nm, 2.9-3.4 nm, 2.9-3.1 nm, 2.9-3.0 nm, 2.9-3.2 nm, 3.0-3.7 nm, 3.0-3.5 nm, 3.0-3.4 nm, 3.0-3.1 nm, 3.0-3.2 nm, 3.1-3.7 nm, 3.1-3.5 nm, 3.1-3.4 nm, 3.1-3.2 nm, 3.2-3.7 nm, 3.2-3.5 nm, 3.2-3.4 nm, 3.4-3.7 nm, 3.4-3.5 nm or 3.5-3.7 nm.

The present invention provides a method for preparing the above Y-TiOPc nanoparticles comprising the following steps:
1) TiOPc is dissolved in concentrated sulfuric acid to give a concentrated sulfuric acid solution of TiOPc, which is mixed with any one of the following substances to give a suspension or hydrosol containing the TiOPc nanoparticles: water, dilute sulfuric acid, an aqueous solution of low molecular weight organic compounds, an aqueous solution of surfactant, and a dilute sulfuric acid solution of surfactants;
2) to the suspension or hydrosol resulted from step 1), at least one of chloralkane and chloroarene is added for extraction, meanwhile, the crystal form of the TiOPc nanoparticles was transformed into phase-Y, with the colloidal solution of Y-TiOPc nanoparticles at the lower organic phase in the system;
3) after extraction, the lower organic phase obtained from the step 2) is taken out, washed with water, and allowed to stand, to which, a solvent miscible with both water and chloralkane or miscible with both water and chloroarene is added afterwards to precipitate the Y-TiOPc nanoparticles, which are dried to give a powder of the Y-TiOPc nanoparticles.

In the above step 1), the low molecular weight organic compound is selected from at least one of the group consisting of methanol, ethanol, isopropyl alcohol, n-butanol, ethylene glycol and acetone; the surfactant has a general structural formula of $R(OCH_2CH_2O)_nR'$, wherein, R is an alkyl group, R' is alkyl or hydrogen, n is an integer of 4~1000, in particular, the surfactant may be polyoxyethylene (23) lauryl ether (structural formula: $R(OCH_2CH_2O)_nR'$, wherein, R is a n-dodecyl group, R' is a hydrogen atom, n is 23; trade name: Brij35) or polyoxyethylene (20) stearyl ether (structural formula: $R(OCH_2CH_2O)_nR'$, wherein, R is a n-octadecyl group, R' is a hydrogen atom, n is 20; trade name: Brij78); the concentration of TiOPc in the concentrated sulfuric acid solution of TiOPc is 0.1~60 g/L, particularly 5~50 g/L, 5~25 g/L or 25~50 g/L, particularly 1~50 g/L, the concentrated sulfuric acid has a mass percent concentration of 90%~98%, particularly 95%~98%; the dilute sulfuric acid has a mass percent concentration of 0.1%~50%, particularly 18~50%; the surfactant has a concentration, in both the aqueous solution of surfactant and the dilute sulfuric acid solution of surfactant, of 0.1~60 g/L, particularly 1~3 g/L or 3~50 g/L, particularly 1~50 g/L; the low molecular weight organic compound has a volume percent, in the aqueous solution of low molecular weight organic compound, of 0.1%~70%, particularly 0.1%~50%; a volume ratio of the concentrated sulfuric acid solution of TiOPc to any of the following substances is 1:5~1:2000, particularly 1:10~1:50: the water, the dilute sulfuric acid, the aqueous solution of low molecular weight organic compound, the aqueous solution of surfactant and the dilute sulfuric acid solution of surfactant; in the mixing process, the temperature is −40~40° C., particularly 0~5° C., −20~−15° C. or −40~−30° C., particularly −20~10° C.;

In the above step 2), the chloralkane is selected from at least one of the group consisting of 1,2-dichloroethane, 1,1-dichloroethane, dichloromethane and chloroform; the chloroarene is selected from at least one of the group consisting of chlorobenzene, o-dichlorobenzene, p-dichlorobenzene and m-dichlorobenzene; the volume ratio between the resulting suspension or hydrosol from the step 1) and chloralkane or chloroarene is 10:1~1:10, particularly 1:5~400, 1:5~200, 1:5~160, 1:5~80, 1:5~40, 1:5~16, 1:16~400, 1:16~200, 1:16~160, 1:16~80, 1:16~40, 1:40~400, 1:40~200, 1:40~160, 1:40~80, 1:80~400, 1:80~200, 1:80~160, 1:160~400, 1:160~200 or 1:200~400, particularly 1:1~1:5.

In the above step 3), the solvent miscible with both water and chloralkane or miscible with both water and chloroarene is selected from at least one of the group consisting of methanol, ethanol, isopropyl alcohol, n-butanol, ethylene glycol, glycerine, acetone, N,N-dimethylformamide and dimethyl sulfoxide. In the precipitating process of step 3), the temperature is −20~40° C., particularly 0~25° C.; in the drying process, the temperature is 0~40° C., particularly 10~30° C.

The above method may further comprise the following step: after step 1) and before step 2), a portion of the dispersant (such as the aqueous solution of sulfuric acid, the aqueous solution of low molecular weight compound, the aqueous solution of surfactant and the like) is removed from the suspension or hydrosol resulted from step 1) to facilitate the subsequent treatment, and the removed dispersant may comprise 80%~95% of the total mass of the suspension or hydrosol;

Since emulsification may occur after being washed with water in step 3), demulsification and phase separation are needed so as to facilitate separation; therefore, the above method for preparing Y-TiOPc nanoparticles provided by the present invention further comprises the following step: when the emulsification occurs in the process of washing with water in the step 3), a solvent miscible with water and chloralkane or miscible with water and chloroarene is added to the system to enhance the demulsification and phase separation so as to facilitate separation.

The colloidal solution, formed by dispersing the Y-type TiOPc nanoparticles prepared in accordance with the above method in chloralkanes or chloroarenes, also falls into the protection scope of the present invention. In this colloidal solution, the chloralkane is selected from at least one of the group consisting of 1,2-dichloroethane, 1,1-dichloroethane, dichloromethane and chloroform; the chloroarene is selected from at least one of the group consisting of chlorobenzene, o-dichlorobenzene, p-dichlorobenzene and m-dichlorobenzene; in the colloidal solution, the Y-TiOPc nanoparticles have a concentration of 0.01~150 g/L, particularly 0.5~130 g/L.

Another purpose of the present invention is to provide the use of the Y-TiOPc nanoparticles, as an organic photoconductive material, in single-layered photoreceptors. This single-layered photoreceptor was composed of an insulating resin and the Y-TiOPc nanoparticles according to any of claims 1-3 dispersed therein. The insulating resin is selected from at least one of the group consisting of polycarbonate, polyolefine, polystyrene, polymethyl methacrylate and polyamide. The Y-type TiOPc nanoparticles in the single-layered photoreceptors have a mass percentage of 10%~40%, particularly 15~20% or 20~35%, particularly 15%~35%.

BEST MODE FOR CARRYING OUT THE INVENTION

The present invention will be further described in combination with specific Examples below, but the present invention is not limited by the following Examples. Said methods are conventional methods unless specifically indicated. And said materials are commercially available unless specifically indicated.

Example 1

Figure 2:
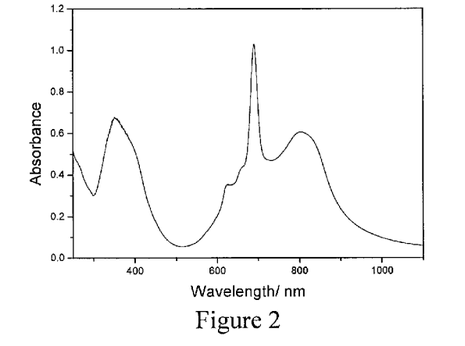
FIG. 2 shows the ultraviolet-visible absorption spectrum of the colloidal solution in Example 1 after extraction.

Preparation of the Y-TiOPc Nanoparticles 1) 250 mg of TiOPc was dissolved in 50 mL of concentrated sulfuric acid with a mass percent concentration of 98%, and the concentrated sulfuric acid solution was dropped into 2 L of water under agitation at 0~5° C. to give a suspension, then, 90% of the aqueous dispersant was removed from this suspension by centrifugation (rotational speed: 4000 r/min, centrifugation time: 5 min);

2) 200 mL of 1,2-dichloroethane was added into the suspension obtained from step 1) under stirring, and the TiOPc particles were extracted into the lower organic phase in the system, forming a blue colloidal solution of TiOPc nanoparticles in 1,2-dichloroethane;

A small amount of this colloidal solution was taken out for the measurement of its ultraviolet-visible absorption spectrum. This spectrum as shown in FIG. 2, exhibits a clear characteristic absorption band of Y-TiOPc nanoparticles at 800 nm.

3) The obtained lower blue organic phase in the system from step 2) was taken out, washed with 100 mL water while being agitated, and then, 50 mL methanol was added upon emulsification of the mixed liquor to enhance demulsification and phase separation, then, the lower blue organic phase was taken out again, and it was allowed to stand after this process was repeated for 5 times, and then to the resulting blue organic phase, 150 mL of methanol was added at 0~5° C. under stirring to precipitate the TiOPc nanoparticles, and the resulting blue precipitate was dried at room temperature, giving 205 mg of Y-TiOPc nanoparticles of the present invention.

Figure 3:
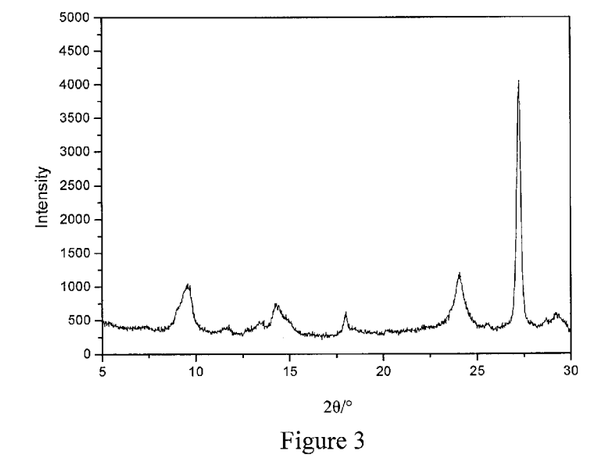
FIG. 3 shows the X-ray powder diffraction pattern of the Y-TiOPc nanoparticle powder prepared in Example 1.

The X-ray powder diffraction (XRD) analysis (see FIG. 3) indicates that the TiOPc obtained form the present Example is in a crystal form of phase-Y. Unlike the XRD spectrums of Y-TiOPc products reported in many patents, no characteristic diffraction peak of phase m TiOPc was observed at 23.5° (2θ) (Enokida, T., Hirohashi, R., Nakamura, T., *J. Imaging Sci.*, 1990, 34, 234) in the XRD spectrum of the Y-TiOPc products prepared in the present Example; as can be seen, the method as provided by the present invention is able to fabricate high pure Y-TiOPc nanoparticles free of TiOPc particles in the crystal form of phase-m.

Figure 4:
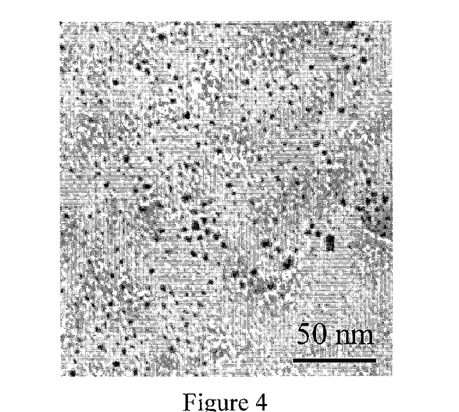
FIG. 4 is a transmission electron microscope image of the Y-TiOPc nanoparticles prepared in Example 1.

The Y-TiOPc nanoparticles as prepared were characterized with the F20 transmission electron microscope (TEM) (see FIG. 4 for TEM image). The results indicate that the particle diameters of the Y-TiOPc nanoparticles prepared in the present Example mainly distribute in the range of 2~4 nm, with an average diameter being 3.1 nm.

Figure 5:
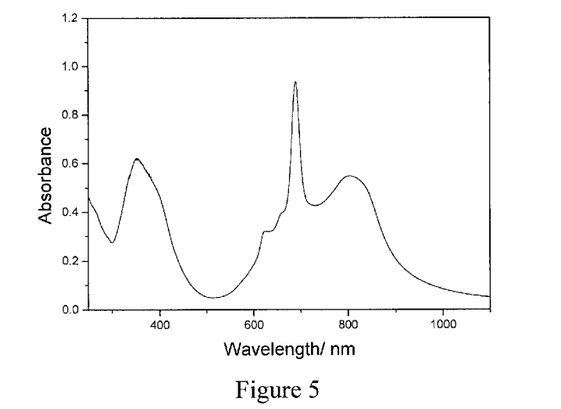
FIG. 5 shows the ultraviolet-visible absorption spectrum of the Y-TiOPc nanoparticles prepared in Example 1 in 1,2-dichloroethane colloidal solution.

Such a Y-TiOPc nanoparticle powder was placed into 1,2-dichloroethanes (the concentration of the Y-TiOPc nanoparticles was $1\times10^{-2}$, 10 and 150 g/L, respectively), and a stable colloidal solution of Y-TiOPc nanoparticles was formed by ultrasonic dispersion. This colloidal solution has an ultraviolet-visible absorption spectrum as shown in FIG. 5. After comparing the absorption peak shape and peak position of FIG. 2 with that of FIG. 5, it was found that there was no significant difference between them. The resulting 1,2-dichloroethane colloidal solution of the TiOPc nanoparticles was dried at room temperature to give a solid, whose XRD pattern showed that it was present in the crystal form of phase-Y. The above experimental results suggest that TiOPc nanoparticles in the crystal form of phase-Y were formed when the TiOPc particles are extracted into the lower organic phase in the system to form a colloidal solution.

Comparative Example 1

TiOPc nanoparticles were prepared in accordance with the method provided in Chinese Patent No. ZL 95117928.4, the method was specifically carried out as follows:

1) 150 mg of TiOPc was dissolved in 50 mL of concentrated sulfuric acid with a mass percent concentration of 98%, and this concentrated sulfuric acid solution was dropped, under agitation, into 500 mL of 0° C. water with 2.4 g of polyoxyethylene (23) lauryl ether (trade name: Brij35) dissolved therein to give a stable hydrosol, the temperature during this process was controlled at 0~5° C.;

2) the above hydrosol was placed in an ultrafilter, ultrafiltered under agitation, then, ultrafiltration was continued by adding water into the hydrosol when the hydrosol in the ultrafilter was concentrated to 20% of the volume of the original hydrosol, this process was repeated until the filtrate changed from acidic to neutral, afterwards, ultrafiltration was continued until the hydrosol was concentrated to about 20 mL prior to being removed.

3) to the removed hydrosol, 20 mL acetone was added under agitation to subject it to demulsification and precipitation, and the lower solid was obtained by centrifugation (centrifugation speed: 4000 r/min, centrifugation time: 5 min), washed with water and acetone alternately for 5 times, and then, dried at room temperature to give rise to the TiOPc nanoparticle powder.

Figure 6:
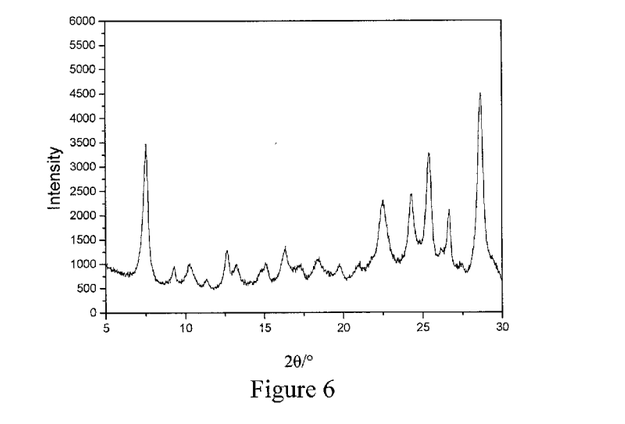
FIG. 6 shows the X-ray powder diffraction pattern of the TiOPc nanoparticle powder prepared in Comparative Example 1.

The XRD pattern of the resulting TiOPc nanoparticle powder (FIG. 6) shows that the TiOPc nanoparticles prepared with this method are in the crystal form of phase-II.

Example 2

Preparation of the Y-TiOPc Nanoparticles 1) 250 mg of TiOPc was dissolved in 5 mL of concentrated sulfuric acid with a mass percent concentration of 98%, and the obtained concentrated sulfuric acid solution was dropped, under agitation, into 800 mL $H_2O$ to give a suspension, the temperature during this process was controlled at 0~5° C.;

2) to the suspension obtained from step 1), 200 mL of 1,2-dichloroethane was added under agitation, and the TiOPc particles were extracted into the organic phase to form a blue colloidal solution;

3) the extracted lower blue organic phase in the system from step 2) was taken out, washed with 100 mL water while being agitated, and it was allowed to stand after this process was repeated 3 times, and the resulting colloidal solution was centrifugated at a rotation speed of 10000 rpm for 20 min to precipitate the TiOPc nanoparticles, then, the lower precipitate was dried at room temperature to give 33 mg of TiOPc nanoparticles provided by the present invention.

The XRD pattern of the TiOPc nanoparticles prepared in the present Example shows that they are in the crystal form of phase-Y. Since no miscible solvent was added for carrying out the present Example, the results indicate that in the preparation method for Y-TiOPc nanoparticles provided by the present invention, the Y-TiOPc nanoparticles are formed while the TiOPc particles are extracted into the organic phase to form a colloidal solution. TEM characterization results indicate that the particle diameters of the prepared Y-TiOPc nanoparticles mainly distribute in the range of 2~4 nm, and have an average diameter of 3.2 nm.

Example 3

Preparation of the Y-TiOPc Nanoparticles 1) 240 mg of TiOPc was dissolved in 4 mL of concentrated sulfuric acid with a mass percent concentration of 98%, and into 800 mL of 18% dilute sulfuric acid at −20° C., this concentrated sulfuric acid solution was dropped under agitation to give a suspension, the temperature during this process was controlled at −20~−15° C., and then, 95% of the aqueous dispersant was removed from the suspension by centrifugation (rotational speed: 4000 rpm, centrifugation time: 5 min);

2) to the suspension obtained from step 1), 200 mL of 1,2-dichloroethane was added under agitation, and the TiOPc particles were extracted into the organic phase to form a blue colloidal solution, meanwhile, the crystal form of the TiOPc particles was transformed into phase-Y; 3) the extracted lower blue organic phase in the system from step 2) was taken out, washed with 100 mL water while being agitated, and then, 50 mL methanol was added upon emulsification of the mixed liquor to enhance the demulsification and phase separation, then, the lower blue organic phase was taken out again, and it was allowed to stand after this process was repeated 5 times; at 0~5° C., 150 mL methanol was added into the resulting lower blue organic phase under agitation to precipitate the TiOPc nanoparticles, and the resulting blue precipitate was dried at room temperature, giving 186 mg of Y-TiOPc nanoparticles provided by the present invention.

Figure 7:
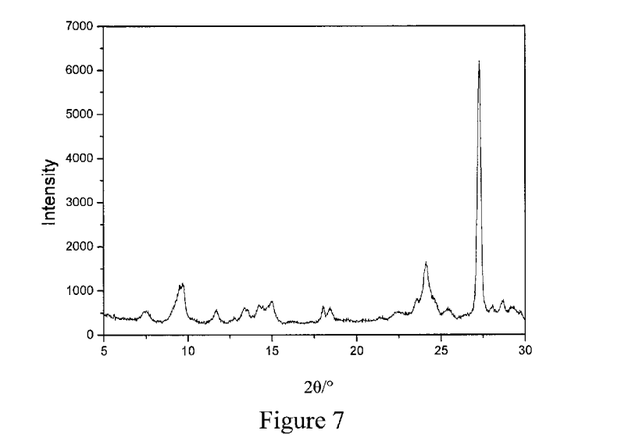
FIG. 7 shows the X-ray powder diffraction pattern of the Y-TiOPc nanoparticle powder prepared in Example 3.
Figure 8:
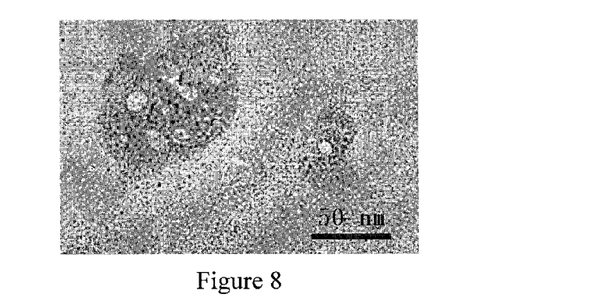
FIG. 8 is a transmission electron microscope image of the Y-TiOPc nanoparticles prepared in Example 3.

The XRD pattern of the TiOPc nanoparticles prepared in the present Example (FIG. 7) shows that they are in the crystal form of phase-Y. TEM characterization results indicate that the particle diameters of the prepared Y-TiOPc nanoparticles mainly distribute in the range of 2~4 nm, with an average diameter of 2.8 nm (as shown in FIG. 8).

Example 4

Preparation of the Y-TiOPc Nanoparticles 1) 250 mg of TiOPc was dissolved in 5 mL of concentrated sulfuric acid with a mass percent concentration of 95%, and this concentrated sulfuric acid solution was dropped, under agitation, into 2 L of $H_2O$ to give a suspension, the temperature during this process was controlled at 0~5° C., and then, 90% of the aqueous dispersant was removed from the suspension by centrifugation (rotational speed: 4000 r/min, centrifugation time: 5 min);

2) to the suspension obtained from step 1), 200 mL of o-dichlorobenzene was added under agitation, and the TiOPc particles were extracted into the organic phase to form a blue colloidal solution, meanwhile, the crystal form of the TiOPc nanoparticles was transformed into phase-Y;

3) the extracted lower blue organic phase in the system from step 2) was taken out, washed with 100 mL of water while being agitated, and then, 50 mL of methanol was added upon emulsification of the mixed liquor to enhance demulsification and phase separation, then, the lower blue organic colloidal solution was taken out again, and it was allowed to stand after this process was repeated 5 times; at 20~25° C., 150 mL of methanol was added into the obtained blue organic phase under agitation to precipitate the TiOPc nanoparticles, and the resulting blue precipitate was dried at room temperature, giving 177 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameter distribution of the prepared Y-TiOPc nanoparticles is mainly in the range of 2~4 nm, with an average diameter being 2.9 nm.

Example 5

Preparation of the Y-TiOPc Nanoparticles 1) 250 mg of TiOPc was dissolved in 50 mL of concentrated sulfuric acid with a mass percent concentration of 98%, and into 800 mL of 50% dilute sulfuric acid at −20° C., this concentrated sulfuric acid solution of TiOPc was dropped under agitation to give a suspension, the temperature during this process was controlled at −20~−15° C., and then, 80% of the aqueous dispersant was removed from the suspension by centrifugation (rotational speed: 4000 r/min, centrifugation time: 5 min);

2) to the suspension obtained from step 1), 200 mL of 1,2-dichloroethane was added under agitation, and the TiOPc particles were extracted into the organic phase to form a blue colloidal solution, meanwhile, the crystal form of the TiOPc nanoparticles was transformed into phase-Y;

3) the extracted lower blue organic phase in the system from step 2) was taken out, washed with 100 mL water while being agitated, and then, 50 mL of acetone was added upon emulsification of the mixed liquor to enhance demulsification and phase separation, then, the lower blue organic phase was taken out again, and it was allowed to stand after this process was repeated 5 times; at 0~5° C., 150 mL of acetone was added into the resulting lower blue organic phase under agitation to precipitate the TiOPc nanoparticles, and the resulting blue precipitate was dried at room temperature, giving 208 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameter distribution of the prepared Y-TiOPc nanoparticles is mainly in the range of 2~4 nm, with an average diameter being 3.3 nm.

Example 6

Preparation of the Y-TiOPc Nanoparticles 1) 250 mg of TiOPc was dissolved in 5 mL of concentrated sulfuric acid with a mass percent concentration of 98%, and this concentrated sulfuric acid solution was dropped, under agitation, into 2 L of $H_2O$ to give a suspension, the temperature during this process was controlled at 0~5° C., and then, 80% of the aqueous dispersant was removed from the suspension by centrifugation (rotational speed: 4000 r/min, centrifugation time: 5 min);

2) to the suspension obtained from step 1), 200 mL of o-dichlorobenzene was added under agitation, and the TiOPc particles were extracted into the organic phase to form a blue colloidal solution, meanwhile, the crystal form of the TiOPc nanoparticles was transformed into phase-Y;

3) the extracted lower blue organic phase in the system from step 2) was taken out, washed with 100 mL water while being agitated, and then, 70 mL of N,N-dimethylformamide was added upon emulsification of the mixed liquor to enhance demulsification and phase separation, then, the lower blue organic phase was taken out again; and it was allowed to stand after this process was repeated 5 times; at 20~25° C., 200 of mL N,N-dimethylformamide was added into the lower blue organic phase under agitation to precipitate the TiOPc nanoparticles, the resulting blue precipitate was dried at room temperature, giving 161 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameter distribution of the prepared Y-TiOPc nanoparticles is mainly in the range of 2~4 nm, with an average diameter being 3.0 nm.

Example 7

Preparation of the Y-TiOPc Nanoparticles 1) 290 mg of TiOPc was dissolved in 160 mL of concentrated sulfuric acid with a mass percent concentration of 90%, and this concentrated sulfuric acid solution was dropped, under agitation, into 800 mL of $H_2O$ to give a suspension, the temperature during this process was controlled at 0~5° C., and then, 80% of the aqueous dispersant was removed from the suspension by centrifugation (rotational speed: 4000 r/min, centrifugation time: 5 min);

2) to the suspension obtained from step 1), 400 mL of o-dichlorobenzene was added under agitation, and the TiOPc particles were extracted into the organic phase to form a blue colloidal solution, meanwhile, the crystal form of the TiOPc nanoparticles was transformed into phase-Y;

3) the extracted lower blue organic phase in the system from step 2) was taken out, washed with 100 mL water while being agitated, and then, 80 mL methanol was added upon emulsification of the mixed liquor to enhance demulsification and phase separation, then, the lower blue organic phase was taken out again; and it was allowed to stand after this process was repeated 5 times; at 20~25° C., 150 mL of methanol was added into the obtained blue organic phase under agitation to precipitate the TiOPc nanoparticles, and the resulting blue precipitate was dried at room temperature, giving 222 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameters of the prepared Y-TiOPc nanoparticles mainly distribute in the range of 2~4 nm, with an average diameter of 3.4 nm.

Example 8

Preparation of the Y-TiOPc Nanoparticles 1) 250 mg of TiOPc was dissolved in 50 mL of concentrated sulfuric acid with a mass percent concentration of 98%, and into 800 mL of water at 0° C. with 2.4 g polyoxyethylene (23) lauryl ether (structural formula: $R(OCH_2CH_2O)_1R'$, wherein, R is a n-dodecyl, R' is a hydrogen, n is 23; trade name: Brij35) dissolved therein, this concentrated sulfuric acid solution of TiOPc was dropped under agitation to give a stable hydrosol, the temperature during this process was controlled at 0~5° C., and then, the above hydrosol was placed in an ultrafilter, ultrafiltered, and concentrated to 20% of the volume of the original hydrosol prior to being removed;

2) to the suspension obtained from step 1), 200 mL of o-dichlorobenzene was added under agitation, and the TiOPc particles were extracted into the organic phase to form a blue colloidal solution, meanwhile, the crystal form of the TiOPc nanoparticles was transformed into phase-Y;

3) the extracted lower blue organic phase in the system from step 2) was taken out, washed with 100 mL of water while being agitated, and then, 50 mL of methanol was added upon emulsification of the mixed liquor to enhance demulsification and phase separation, then, the lower blue organic phase was taken out again, and it was allowed to stand after this process was repeated 5 times; at 0~5° C., 150 mL of methanol was added into the lower blue organic phase under agitation to precipitate the TiOPc nanoparticles, and the resulting blue precipitate was dried at room temperature, giving 180 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameters of the prepared Y-TiOPc nanoparticles mainly distribute in the range of 2~4 nm, with an average diameter of 2.8 nm.

Example 9

Preparation of the Y-TiOPc Nanoparticles 1) 250 mg of TiOPc was dissolved in 10 mL of concentrated sulfuric acid with a mass percent concentration of 98%, and into 800 mL of water at 0° C. with 2.4 g of polyoxyethylene (20) stearyl ether (structural formula: $R(OCH_2CH_2O)_nR'$, wherein, R is a n-octadecyl, R' is a hydrogen, n is 20; trade name: Brij78) dissolved therein, this concentrated sulfuric acid solution of TiOPc was dropped under agitation to give a stable hydrosol, the temperature during this process was controlled at 0~5° C., and then, the above hydrosol was placed in an ultrafilter, ultrafiltered, and concentrated to 20% of the volume of the original hydrosol prior to being removed;
2) to the suspension obtained from step 1), 200 mL of 1,2-dichloroethane was added under agitation, and the TiOPc particles were extracted into the organic phase to form a blue colloidal solution, meanwhile, the crystal form of the TiOPc nanoparticles was transformed into phase-Y;
3) the extracted lower blue organic phase in the system from step 2) was taken out, washed with 100 mL of water while being agitated, and then, 50 mL of acetone was added upon emulsification of the mixed liquor to subject it to demulsification and phase separation, then, the lower blue organic phase was taken out again, and it was allowed to stand after this process was repeated several times; at 0~5° C., 150 mL of acetone was added into the obtained blue organic phase under agitation to precipitate the TiOPc nanoparticles, and the resulting blue precipitate was dried at room temperature, giving 193 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameters of the prepared Y-TiOPc nanoparticles mainly distribute in the range of 2~4 nm, with an average diameter of 3.7 nm.

Example 10

Preparation of the Y-TiOPc Nanoparticles 1) 250 mg of TiOPc was dissolved in 50 mL of concentrated sulfuric acid with a mass percent concentration of 95%, and into 800 mL of water at 0° C. with 0.8 g of polyoxyethylene (23) lauryl ether (structural formula: $R(OCH_2CH_2O)_nR'$, wherein, R is a n-dodecyl, R' is a hydrogen, n is 23; trade name: Brij35) dissolved therein, this concentrated sulfuric acid solution was dropped under agitation to give a stable hydrosol, the temperature during this process was controlled at 0~5° C., and then, the above hydrosol was placed in an ultrafilter, ultrafiltered, and concentrated to 20% of the volume of the original hydrosol prior to being removed;
2) to the suspension obtained from step 1), 200 mL of o-dichlorobenzene was added under agitation, and the TiOPc particles were extracted into the organic phase to form a blue colloidal solution, meanwhile, the crystal form of the TiOPc nanoparticles was transformed into phase-Y;
3) the extracted lower blue organic phase in the system from step 2) was taken out, washed with 100 mL of water while being agitated, and then, 50 mL of methanol was added upon emulsification of the mixed liquor to subject it to demulsification and phase separation, then, the lower blue organic phase was taken out again, and it was allowed to stand after this process was repeated 5 times; at 0~5° C., 150 mL of methanol was added into the lower blue organic phase under agitation to precipitate the TiOPc nanoparticles, and the resulting blue precipitate was dried at room temperature, giving 166 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameter distribution of the prepared Y-TiOPc nanoparticles is mainly in the range of 2~4 nm, with an average particle diameter being 2.8 nm.

Example 11

Preparation of the Y-TiOPc Nanoparticles 1) 250 mg of TiOPc was dissolved in 10 mL of concentrated sulfuric acid with a mass percent concentration of 98%, and into 800 mL of water at 0° C. with 40 g polyoxyethylene (20) stearyl ether (structural formula: $R(OCH_2CH_2O)_nR'$, wherein, R is a n-octadecyl, R' is a hydrogen, n is 20; trade name: Brij78) dissolved therein, this concentrated sulfuric acid solution was dropped under agitation to give a stable hydrosol, the temperature during this process was controlled at 0~5° C., and then, the above hydrosol was placed in an ultrafilter, ultrafiltered, and concentrated to 20% of the volume of the original hydrosol prior to being removed;
2) to the suspension obtained from step 1), 200 mL of 1,2-dichloroethane was added under agitation, and the TiOPc particles were extracted into the organic phase to form a blue colloidal solution, meanwhile, the crystal form of the TiOPc nanoparticles was transformed into phase-Y;
3) the extracted lower blue organic phase in the system from step 2) was taken out, washed with 100 mL of water while being agitated, and then, 50 mL of acetone was added upon emulsification of the mixed liquor to enhance demulsification and phase separation, then, the lower blue organic phase was taken out again, and it was allowed to stand after this process was repeated several times; at 0~5° C., 150 mL of acetone was added into the lower blue organic phase under agitation to precipitate the TiOPc nanoparticles, and the resulting blue precipitate was dried at room temperature, giving 177 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameters of the prepared Y-TiOPc nanoparticles mainly distribute in the range of 2~4 nm, with an average diameter of 3.5 nm.

Example 12

Preparation of the Y-TiOPc Nanoparticles 1) 250 mg of TiOPc was dissolved in 50 mL of concentrated sulfuric acid with a mass percent concentration of 98%, and this concentrated sulfuric acid solution was dropped, under agitation, into 800 mL of 30% aqueous solution of methanol to give a suspension, the temperature during this process was controlled at −20~−15° C., and then, 90% of the dispersant, i.e., the aqueous solution of methanol, was removed from the suspension by centrifugation (rotational speed: 4000 r/min, centrifugation time: 5 min);
2) to the suspension obtained from step 1), 200 mL of 1,2-dichloroethane was added under agitation, and the TiOPc particles were extracted into the organic phase to form a blue colloidal solution, meanwhile, the crystal form of the TiOPc nanoparticles was transformed into phase-Y;

3) the extracted lower blue organic phase in the system from step 2) was taken out, washed with 100 mL of water while being agitated, and then, 50 mL of methanol was added upon emulsification of the mixed liquor to subject it to demulsification and phase separation, then, the lower blue organic phase was taken out again; and it was allowed to stand after this process was repeated 5 times; at 20~25° C., 150 mL of methanol was added into the obtained blue organic phase under agitation to precipitate the TiOPc nanoparticles, and the resulting blue precipitate was dried at room temperature, giving 216 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameters of the prepared Y-TiOPc nanoparticles mainly distribute in the range of 2~4 nm, with an average diameter of 2.8 nm.

Example 13

Preparation of Y-TiOPc Nanoparticles 1) 250 mg of TiOPc was dissolved in 50 mL of concentrated sulfuric acid with a mass percent concentration of 98%, and this concentrated sulfuric acid solution was dropped, under agitation, into 800 mL of 50% aqueous solution of ethylene glycol to give a suspension, the temperature during this process was controlled at −40~−30° C., and then, 85% of the dispersant, i.e., the aqueous solution of ethylene glycol, was removed from the suspension by centrifugation (rotational speed: 4000 r/min, centrifugation time: 5 min);
2) to the suspension obtained from step 1), 200 mL of 1,2-dichloroethane was added under agitation, and the TiOPc particles were extracted into the organic phase to form a blue colloidal solution, meanwhile, the crystal form of the TiOPc nanoparticles was transformed into phase-Y;
3) the extracted lower blue organic phase in the system from step 2) was taken out, washed with 100 mL of water while being agitated, and then, 50 mL of methanol was added upon emulsification of the mixed liquor to subject it to demulsification and phase separation, then, the lower blue organic phase was taken out again; and it was allowed to stand after this process was repeated 5 times; at 20~25° C., 150 mL of acetone was added into the lower blue organic phase under agitation to precipitate the TiOPc nanoparticles, and the resulting blue precipitate was dried at room temperature, giving 170 mg of Y-TiOPc nanoparticles provided by the present invention.

The XRD spectrum of the TiOPc nanoparticles prepared in the present Example shows that they are in the crystal form of phase-Y. TEM characterization results indicate that the particle diameters of the prepared Y-TiOPc nanoparticles mainly distribute in the range of 2~4 nm, with an average diameter of 3.0 nm.

Example 14

Preparation of a Single-Layered Photoreceptor 12 mg of Y-TiOPc nanoparticle powder prepared in Example 1 was added into 0.2 mL of 1,2-dichloroethane, and treated at 0~5° C. by ultrasonication for 10 min to give a stable colloidal solution. To this colloidal solution, 350 mg of a 1,2-dichloroethane solution (concentration: 200 g/L) of polycarbonate Z-300 (Article No.: PCZ-300, purchased from Mitsubishi Gas Chemical Company, Inc., Japan; average molecular weight: 30000) was added, and the mixture was agitated under 25° C. for 3 hours to fabricate a photoconductor coating liquid with excellent dispersion stability. The coating liquid was evenly coated onto an aluminum plate by a polytetrafluoroethylene scraper with a notch (depth: 0.2 mm) to form a film, which was dried at 60° C. for 3 hours after natural drying, generating the single-layered photoreceptors provided by the present invention. This single-layered photoreceptor film has a thickness of 20 micrometers, and a mass percentage of TiOPc of 20%.

Comparative Example 2

12 mg of Y-TiOPc powder prepared in accordance with the method provided in Chinese Patent No. ZL00,124736.0 was added into 0.2 mL of 1,2-dichloroethane, and treated at 0~5° C. by ultrasonication for 10 min. To this solution, 350 mg of a 1,2-dichloroethane solution of PCZ-300 (concentration: 200 g/L) was added, and the mixture was agitated under 25° C. for 3 hours to give a coating liquid. The coating liquid was evenly coated onto an aluminum plate by a polytetrafluoroethylene scraper with a notch (depth: 0.2 mm) to form a film, which was dried at 60° C. for 3 hours after natural drying, generating a single-layered photoreceptor film with the same TiOPc content as Example 14.

Photoreceptor films with different TiOPc contents may be prepared by changing the amount of Y-TiOPc nanoparticles, such as the following Examples.

Example 15

Preparation of a Single-Layered Photoreceptor 8.5 mg of Y-TiOPc nanoparticle powder prepared in Example 6 was added into 0.2 mL of o-dichlorobenzene, and treated at 0~5° C. by ultrasonication for 10 min to give a stable colloidal solution. To this colloidal solution, 350 mg of an o-dichlorobenzene solution of PCZ-300 (concentration: 200 g/L) was added, and the mixture was agitated at 25° C. for 6 hours to fabricate a photoconductor coating liquid with excellent dispersion stability. The coating liquid was evenly coated onto an aluminum plate by a polytetrafluoroethylene scraper with a notch (depth: 0.2 mm) to form a film, which was dried at 60° C. for 3 hours after natural drying, generating the single-layered photoreceptors provided by the present invention. This single-layered photoreceptor film has a thickness of 20 micrometers, and a mass percentage of TiOPc of 15%.

Example 16

Preparation of a Single-Layered Photoreceptor 26 mg of Y-TiOPc nanoparticle powder prepared in Example 7 was added into 0.2 mL of 1,2-dichloroethane, and treated at 0~5° C. by ultrasonication for 10 min to give a stable colloidal solution. To this colloidal solution, 350 mg of a 1,2-dichloroethane solution of polymethyl methacrylate (PMMA, having an average molecular weight of 35000) (concentration: 200 g/L) was added, and the mixture was agitated at 25° C. for 3 hours to fabricate photoconductor coating liquid with excellent dispersion stability. The coating liquid was evenly coated onto an aluminum plate by a polytetrafluorethylene scraper with a notch (depth: 0.2 mm) to form a film, which was dried at 60° C. for 3 hours after natural drying, generating the single-layered photoreceptors provided by the present invention. This single-layered photoreceptor film has a thickness of 20 micrometers, and a mass percentage of TiOPc of 35%.

Figure 10:
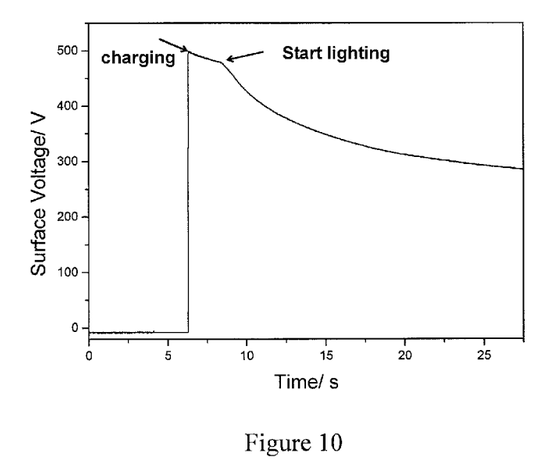
FIG. 10 shows photo-induced discharging curve of the single-layered photoreceptor film prepared in Comparative Example 2.

Testing of the photoelectric performance of a single-layered photoreceptor:

The photoconductive properties of the prepared single-layered photoreceptor were measured on an EPA-8200 electrostatic analyzer with the positively charged mode (monochromatic light of 1.0 µW ($\lambda$=780 nm) was used in these measurements; the voltage of the corona discharger was regulated between +4.8 kV and +5.8 kV; the maximum charging potential of the photoreceptors was between +500 V and +600 V). The photoconductive properties of the single-layered photoreceptors prepared with the Y-TiOPc nanoparticles of the present invention and the single-layered photoreceptors prepared in Comparative Examples are listed in Table 1.

photo-induced discharging curve as shown in FIG. 10; however, such performances are not applicable in the field of xerography.

INDUSTRIAL APPLICATION

The present inventors previously invented some phthalocyanine photoconductor nanoclusters of small sizes including II-TiOPc, which possess good photoconductive properties. Studies conducted by the present inventors suggest that not all TiOPc nanoparticles in any crystal form can disperse in chloralkanes or chloroarenes to form stable colloidal solutions, for example, TiOPc nanoparticles in the crystal form of phase-m do not possess the above properties. The structure of Y-TiOPc is still not very clear up to now. One significant difference between the metastable TiOPc in the crystal form

TABLE 1

Photoconductive properties of the single-layered photoreceptors prepared based on Y-TiOPc nanoparticles of the present invention and correlated Comparative Examples

| Y-TiOPc nanoparticles | Content of Y-TiOPc in photoreceptor films | Maximum charging potential $V_0$ (V) | Dark decay rate $R_d$ (V/s) | Sensitivity $E_{1/2}$ (µJ/cm$^2$) | Sensitivity $E_{1/5}$ (µJ/cm$^2$) | Residual potential $V_r$ (V) |
|---|---|---|---|---|---|---|
| Example 1 | 20% | 525 | 9 | 0.31 | 0.39 | 14 |
| Example 2 | 26% | 533 | 18 | 0.29 | 0.36 | 12 |
| Example 3 | 18% | 514 | 8 | 0.33 | 0.44 | 21 |
| Example 4 | 23% | 552 | 13 | 0.27 | 0.30 | 12 |
| Example 5 | 25% | 537 | 16 | 0.26 | 0.29 | 8 |
| Example 6 | 15% | 545 | 6 | 0.42 | 0.49 | 23 |
| Example 7 | 35% | 516 | 29 | 0.17 | 0.21 | 7 |
| Example 8 | 32% | 525 | 27 | 0.20 | 0.24 | 8 |
| Example 9 | 22% | 560 | 12 | 0.28 | 0.32 | 10 |
| Example 10 | 27% | 524 | 18 | 0.23 | 0.26 | 9 |
| Example 11 | 17% | 559 | 8 | 0.35 | 0.41 | 13 |
| Example 12 | 30% | 511 | 23 | 0.22 | 0.25 | 9 |
| Example 13 | 26% | 544 | 15 | 0.30 | 0.35 | 11 |
| Comparative Example 1 | 18% | 608 | 20 | 0.74 | 0.81 | 11 |
| Comparative Example 1 | 20% | 596 | 27 | 0.54 | 0.59 | 8 |
| Comparative Example 1 | 25% | 523 | 43 | 0.38 | 0.42 | 4 |
| Comparative Example 2 | 20% | 501 | 10 | — | — | 289 |

Figure 9:
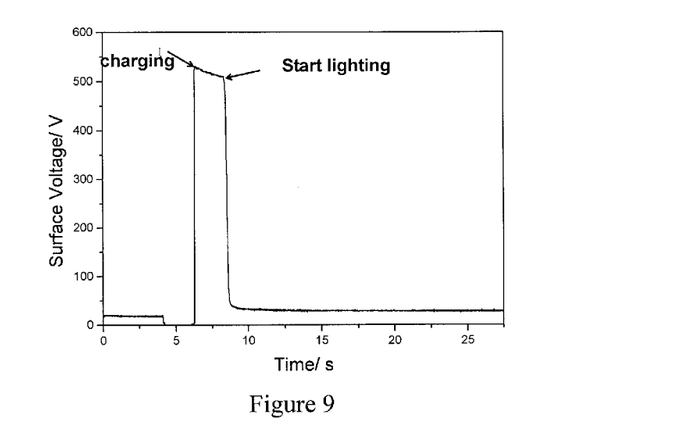
FIG. 9 shows the photo-induced discharging curve of the single-layered photoreceptor film prepared in Example 14.

As can be seen from Table 1, the single-layered photoreceptors formed by dispersing Y-TiOPc nanoparticles prepared in the present invention in insulating resins possess excellent overall photoconductive properties. Compared with our previously reported single-layered photoreceptors composed of II-TiOPc nanoparticles (Comparative Example 1) and insulating resins (Chao, W., Zhang, X. R., Xiao, C., Liang, D. J., Wang, Y., *J. Colloid Interface Sci.*, 2008, 325, 198), the single-layered photoreceptors based on Y-TiOPc nanoparticles of the present invention exhibit significantly increased chargeability, dramatically decreased dark decay rate, and remarkably improved photoconductive sensitivity. The photo-induced discharging curve of the single-layered photoreceptor prepared in Example 14 is shown in FIG. 9.

On the other hand, the testing results for the single-layered photoreceptors fabricated with the TiOPc nanoparticles prepared in Comparative Example 2 indicate that the single-layered photoreceptors made by dispersing the Y-TiOPc powder prepared in accordance with the method provided in Chinese Patent No. ZL00,124736.0 in the same insulating resins have a very poor photoconductive sensitivity, and a of phase-Y and TiOPc in other crystal forms is that Y-TiOPc crystals contain a lot of water molecules (Okada, O., Klein, M. L., *PCCP* 2001, 3, 1530), and the metastable organic semiconductors of small sizes have a lower phase transition temperature; therefore, it is unpredictable, before the present invention, whether the Y-TiOPc nanoparticles of 2~4 nanometers can be present stably, and whether these nanoparticles can disperse in chloralkanes or chloroarenes to form a stable colloidal solution.

The method for preparing Y-TiOPc nanoparticles provided in the present invention is characterized in that the TiOPc nanoparticles are extracted into the organic phase with chloralkanes or chloroarenes to form a colloidal solution of TiOPc nanoparticles, meanwhile, the crystal form of the TiOPc nanoparticles was transformed into phase-Y. During transformation of the particles' crystal form in the present invention, TiOPc nanoparticles are separated with each other, avoiding formation of rigid connections among particles or increase in particle sizes due to the molecular rearrangement on the surfaces of the TiOPc particles, which is one of important reasons why the Y-TiOPc nanoparticles as prepared can disperse in chloralkanes or chloroarenes to form stable colloidal solutions. In addition, as compared with other preparation methods for Y-TiOPc particles, the preparation method provided in the present invention further possesses another prominent advantage, that is, with the special conditions for the precipitation of TiOPc, and for the formation of Y-TiOPc nanoparticles, high purity Y-TiOPc nanoparticles without other crystalline particles such as m-TiOPc particles can be obtained (see Example 1).

As an application of the Y-TiOPc nanoparticles of the present invention, the single-layered photoreceptors, based on the Y-TiOPc nanoparticles of the present invention, provided by the present invention solve a difficult problem that high photoconductive sensitivity and high chargeability can not be realized simultaneously by previous single-layered organic photoreceptors composed of phthalocyanines and insulating resins, which can not be acquired by simple inference based on prior knowledge. The single-layered photoreceptors provided by the present invention exhibit excellent xerography properties, which are closely related to the following factors: 1) the Y-TiOPc nanoparticles of the present invention have a very high dispersion stability in the mixture of the solvent and insulating resin, not prone to aggregate and form a dark conductivity pathway upon drying of the coating liquid; 2) the Y-TiOPc nanoparticles of the present invention have obvious quantum size effect, they have a wider band gap of semiconductors compared to those of larger particles, thereby reducing the probability of thermally exciting electrons to the conduction bands, which contributes to improving the chargeability; 3) there is a strong light-induced enhancement effect of electron tunneling among the Y-TiOPc nanoparticles of the present invention dispersed in insulating resins.

The invention claimed is:

1. Oxotitanium phthalocyanine nanoparticles in the crystal form of phase-Y (Y-TiOPc), characterized in that: the Y-TiOPc nanoparticles have particle diameters of 2~4 nanometers.

2. The nanoparticles according to claim 1, characterized in that: the Y-TiOPc nanoparticles can disperse in chloralkanes or chloroarenes to form stable colloidal solutions.

3. A method for preparing the Y-TiOPc nanoparticles of claim 1, comprising the following steps:
   1) dissolving TiOPc in concentrated sulfuric acid to give a concentrated sulfuric acid solution of TiOPc, mixing the concentrated sulfuric acid solution of TiOPc with any one of the following substances to give a suspension or hydrosol containing TiOPc nanoparticles: water, dilute sulfuric acid, an aqueous solution of a low molecular weight organic compound, an aqueous solution of a surfactant, and a dilute sulfuric acid solution of a surfactant;
   2) adding a solvent selected from at least one of chloralkanes and chloroarenes into the suspension or hydrosol obtained from step 1) for extraction, meanwhile, transformation of the crystal form of the TiOPc particles into phase-Y is achieved, with the colloidal solution of Y-TiOPc nanoparticles at the lower organic phase in the system;
   3) collecting the extracted lower organic phase obtained from the step 2), the organic phase is washed with water and allowed to stand, then, a solvent miscible with both water and chloralkane or miscible with both water and chloroarene is added to precipitate the Y-TiOPc nanoparticles, which are dried to give a powder of the Y-TiOPc nanoparticles.

4. The method according to claim 3, characterized in that: in the step 1), the low molecular weight organic compound is selected from at least one of the group consisting of methanol, ethanol, isopropyl alcohol, n-butanol, ethylene glycol and acetone; and the surfactant has a general structural formula of $R(OCH_2CH_2O)_nR'$, wherein, R is an alkyl, R' is an alkyl or a hydrogen, and n is an integer of 4~1000;
   in the step 2), the chloralkane is selected from at least one of the group consisting of 1,2-dichloroethane, 1,1-dichloroethane, dichloromethane and chloroform; and the chloroarene is selected from at least one of the group consisting of chlorobenzene, o-dichlorobenzene, p-dichlorobenzene and m-dichlorobenzene;
   in the step 3), the solvent miscible with both water and chloralkane or miscible with both water and chloroarene is selected from at least one of the group consisting of methanol, ethanol, isopropyl alcohol, n-butanol, ethylene glycol, glycerine, acetone, N,N-dimethylformamide and dimethyl sulfoxide.

5. The method according to claim 4, characterized in that: in the step 1), the concentration of the TiOPc in the concentrated sulfuric acid solution of the TiOPc is 0.1~60 g/L, particularly 1~50 g/L, the concentrated sulfuric acid has a mass percent concentration of 90%~98%, particularly 95%~98%; the dilute sulfuric acid has a mass percent concentration of 0.1%~50%; the surfactant has a concentration, in both the aqueous solution of the surfactant and the dilute sulfuric acid solution of the surfactant, of 0.1~60 g/L, particularly 1~50 g/L; the low molecular weight organic compound has a volume percent, in the aqueous solution of the low molecular weight organic compound, of 0.1%~70%, particularly 0.1%~50%; and a volume ratio of the concentrated sulfuric acid solution of the TiOPc to any of the following substances is 1:5~1:2000, particularly 1:10~1:50: the water, the dilute sulfuric acid, the aqueous solution of the low molecular weight organic compound, the aqueous solution of the surfactant and the dilute sulfuric acid solution of the surfactant;
   in the step 2), a volume ratio between the suspension or hydrosol obtained from the step 1) and the chloralkane or chloroarene is 10:1~1:10, particularly 1:1~1:5.

6. The method according to claim 5, characterized in that: in the mixing process of the step 1), the temperature is −40~40° C., particularly −20~10° C.;
   in the precipitating process of the step 3), the temperature is −20~40° C., particularly 0~25° C.;
   and in the drying process, the temperature is 0~40° C., particularly 10~30° C.

7. The method according to claim 6, characterized in that: the method for preparing the Y-TiOPc nanoparticles further comprises the following steps:
   after the step 1) and before the step 2), removing a portion of the dispersant from the suspension or hydrosol resulted from the step 1); and the removed dispersant comprises 80% 95% of the total mass of the suspension or hydrosol;
   upon emulsification occurs in the process of washing with water in the step 3), adding the solvent miscible with water and chloralkane or miscible with water and chloroarene to enhance demulsification and phase separation so as to facilitate separation.

8. A colloidal solution formed by dispersing the Y-TiOPc nanoparticles of claim 1 in a solvent selected from at least one of chloralkanes and chloroarenes.

9. The colloidal solution according to claim 8, characterized in that: the chloralkane is selected from at least one of the group consisting of 1,2-dichloroethane, 1,1-dichloroethane, dichloromethane and chloroform; the chloroarene is selected from at least one of the group consisting of chlorobenzene, o-dichlorobenzene, m-dichlorobenzene and p-dichlorobenzene; and in the colloidal solution, the Y-TiOPc nanoparticles have a concentration of 0.01~150 g/L, particularly 0.5~130 g/L.

10. The Y-TiOPc nanoparticles of claim 1 as an organic photoconductive material in a single-layered photoreceptor, the single-layered photoreceptor is composed of an insulating resin and the Y-TiOPc nanoparticles dispersed in the insulating resin.

11. The Y-TiOPc nanoparticles according to claim 10, characterized in that: the insulating resin is selected from at least one of the group consisting of polycarbonate, polyolefine, polystyrene, polymethyl methacrylate and polyamide.

12. The Y-TiOPc nanoparticles according to claim 11, characterized in that: in the single-layered photoreceptor, the Y-TiOPc nanoparticles have a mass percentage of 10%~40%, particularly 15%~35%.

13. Oxotitanium phthalocyanine nanoparticles in the crystal form of phase-Y (Y-TiOPc), characterized in that: the Y-TiOPc nanoparticles have particle diameters of 2~4 nanometers, and the Y-TiOPc nanoparticles are prepared in accordance with method of claim 7.

14. The method according to claim 3, characterized in that: the method for preparing the Y-TiOPc nanoparticles further comprises the following steps:
   after the step 1) and before the step 2), removing a portion of the dispersant from the suspension or hydrosol resulted from the step 1); and the removed dispersant comprises 80%~95% of the total mass of the suspension or hydrosol;
   upon emulsification occurs in the process of washing with water in the step 3), adding the solvent miscible with water and chloralkane or miscible with water and chloroarene to enhance demulsification and phase separation so as to facilitate separation.

15. The method according to claim 4, characterized in that: the method for preparing the Y-TiOPc nanoparticles further comprises the following steps:
   after the step 1) and before the step 2), removing a portion of the dispersant from the suspension or hydrosol resulted from the step 1); and the removed dispersant comprises 80%~95% of the total mass of the suspension or hydrosol;
   upon emulsification occurs in the process of washing with water in the step 3), adding the solvent miscible with water and chloralkane or miscible with water and chloroarene to enhance demulsification and phase separation so as to facilitate separation.

16. The method according to claim 5, characterized in that: the method for preparing the Y-TiOPc nanoparticles further comprises the following steps:
   after the step 1) and before the step 2), removing a portion of the dispersant from the suspension or hydrosol resulted from the step 1); and the removed dispersant comprises 80%~95% of the total mass of the suspension or hydrosol;
   upon emulsification occurs in the process of washing with water in the step 3), adding the solvent miscible with water and chloralkane or miscible with water and chloroarene to enhance demulsification and phase separation so as to facilitate separation.

* * * * *